United States Patent [19]
Dehrmann

[11] Patent Number: 5,996,751
[45] Date of Patent: Dec. 7, 1999

[54] HYDRODYNAMIC TORQUE CONVERTER WITH A DRIVER FOR THE PISTON OF A LOCKUP CLUTCH

[75] Inventor: Uwe Dehrmann, Würzburg, Germany

[73] Assignee: Mannesmann Sachs AG, Schweinfurt, Germany

[21] Appl. No.: 09/233,264

[22] Filed: Jan. 19, 1999

[30] Foreign Application Priority Data

Jan. 19, 1998 [DE] Germany ................ 198 01 723

[51] Int. Cl.⁶ ..................................... F16H 45/02
[52] U.S. Cl. ..................... 192/3.29; 192/207; 192/209
[58] Field of Search ................. 192/3.28, 3.29, 192/3.3, 207, 209

[56] References Cited

U.S. PATENT DOCUMENTS

| | | | |
|---|---|---|---|
| 4,291,790 | 9/1981 | Staub, Jr. ............... | 192/209 X |
| 5,482,151 | 1/1996 | Ookubo et al. .......... | 192/3.29 |
| 5,553,693 | 9/1996 | Schöder et al. ......... | 192/3.29 |
| 5,660,258 | 8/1997 | Bacon et al. ............ | 192/3.29 |

FOREIGN PATENT DOCUMENTS 44 23 640 A1   6/1995   Germany .
195 27 853 C1  12/1996  Germany .

Primary Examiner—Richard M. Lorence
Attorney, Agent, or Firm—Cohen, Pontani, Lieberman & Pavane

[57] ABSTRACT

A hydrodynamic torque converter has a converter circuit which is formed of an impeller wheel, a turbine wheel and a stator wheel. A driver for a piston of a lockup clutch is provided at the turbine wheel. The piston is rotatable in the circumferential direction and displaceable in the axial direction. The driver has at least one projection projecting in the direction of an associated recess in the piston in order to produce a connection forming a positive engagement in the circumferential direction while allowing a relative movement of the piston in the axial direction. The projection has at least two legs which are arranged at a distance from one another and extend at a predetermined angle relative to the circumferential direction. These legs are connected with one another, at least at their free ends, by a stiffener and have transmission surfaces at their sides remote of the stiffener. The transmission surfaces are provided for producing a working contact in each instance with an associated counter-surface of the recess of the piston, which counter-surface is adjacent to the transmission surface in the circumferential direction.

11 Claims, 4 Drawing Sheets

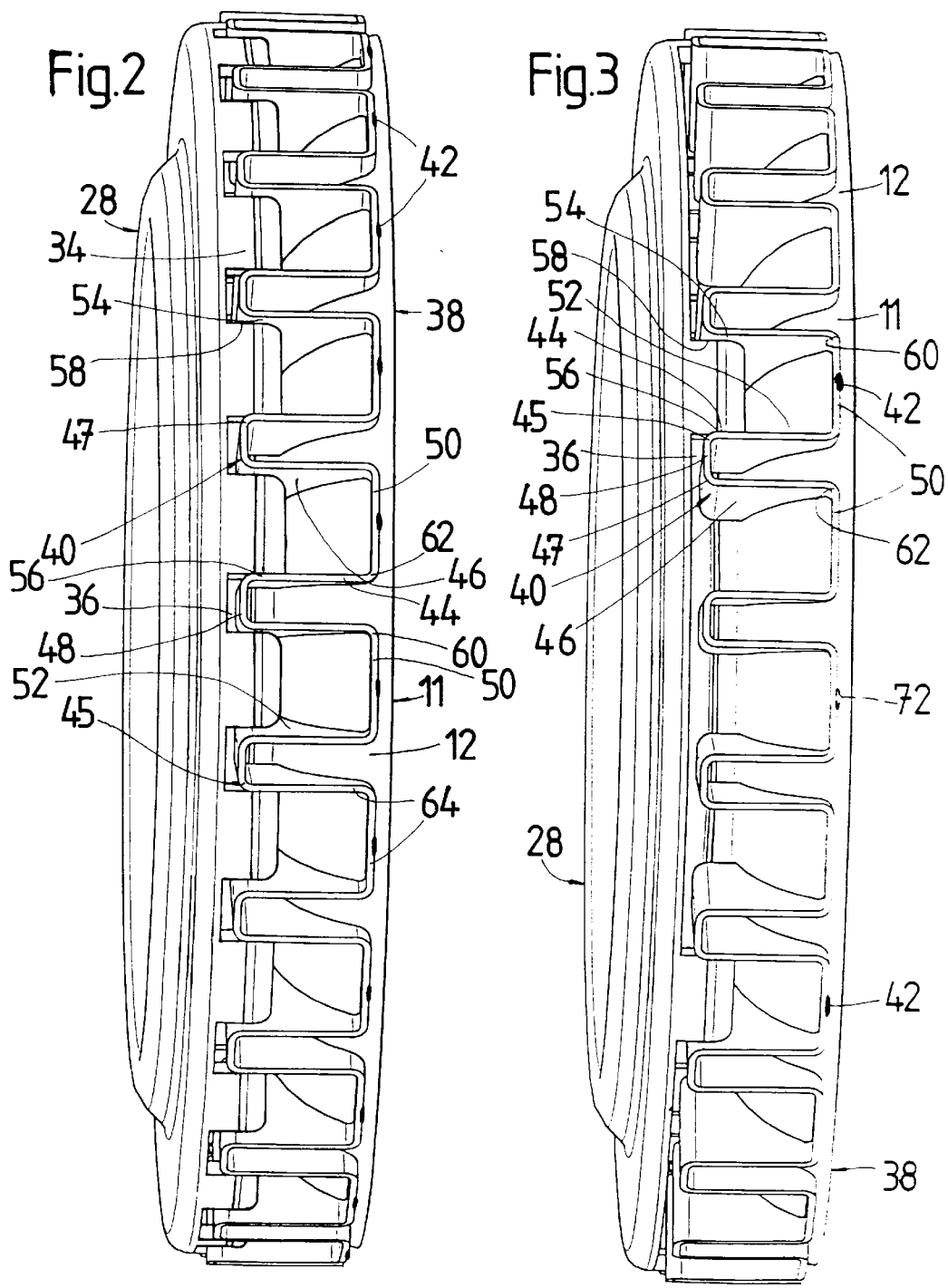

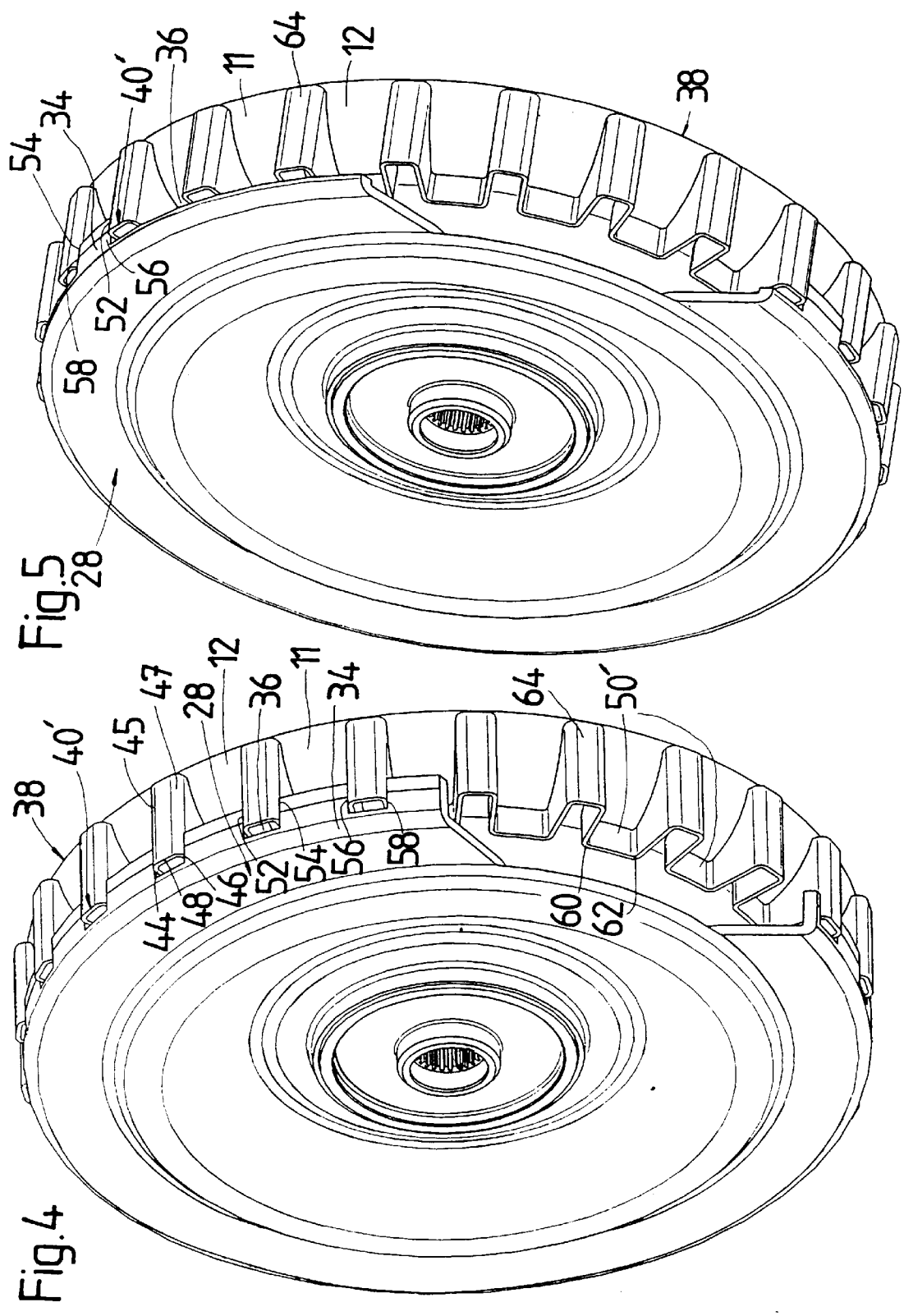

HYDRODYNAMIC TORQUE CONVERTER WITH A DRIVER FOR THE PISTON OF A LOCKUP CLUTCH

BACKGROUND OF THE INVENTION

1. Field of the Invention

The invention relates to a hydrodynamic torque converter.

2. Discussion of the Prior Art

A torque converter of the type mentioned above is known, for example, from German reference DE 195 27 853 A1, which has a converter circuit formed of an impeller wheel, a turbine wheel and a stator wheel. A driver for the piston of a lockup clutch is fastened to the turbine shell of the turbine wheel. The piston is mounted so as to be rotatable in the circumferential direction and displaceable in the axial direction. In the circumferential area, the piston has an axial shoulder which is directed to the driver and which has recesses at its free end that are uniformly distributed along the circumference. The projections provided at the driver in the radial circumferential region engage in the recesses without play in the circumferential direction. As a result of this driver, the turbine wheel is connected with the piston so as to be fixed with respect to rotation relative to it, so that torque which is transferred from the converter housing to the piston via a friction facing at the piston is transferred via the driver to the turbine wheel and, from the turbine wheel, to a driven shaft via an internal toothing.

It is disadvantageous in a driver of the type mentioned above that when the torque, which is often very high, is transmitted there is considerable surface area pressing at the sides of each recess at the axial shoulder of the piston and at the sides of the associated projection at the driver, which sides are in a working connection with one another, so that wear results very quickly at these contact surfaces. This has the undesirable result that the axial displacement capability of the piston is impeded.

For the transfer of high torque, the projections at the driver must be correspondingly wide in the circumferential direction. The rotational connection between the turbine wheel and the piston is therefore rigid, so that, along with the torque introduced by the converter housing, torsional vibrations which are superposed on the torque reaching the piston are transmitted to the turbine wheel without being filtered. In order to alleviate this problem, torsional damping devices with springs extending in the circumferential direction and, as the case may be, with at least one friction device are added, resulting in a sharp increase in the manufacturing costs and space requirement for the lockup clutch in the torque converter. Another solution consists in operating the piston with slip relative to the converter housing so as to reduce the torsional vibrations in this way through friction. This has the disadvantage of a comparatively high loss of output and an increased demand for guiding off the occurring frictional heat in order to prevent overheating of the converter components in the area of extension of the friction surface.

SUMMARY OF THE INVENTION

Accordingly, it is an object of the invention to provide a connection between the turbine wheel of a hydrodynamic torque converter and the piston of a lockup clutch so that wear caused by operation is minimal and steps for damping torsional vibrations can be dispensed with.

Pursuant to this object, and others which will become apparent hereafter, one aspect of the present invention resides in a hydrodynamic torque converter having a driver for the backup clutch piston, which driver has a projection that projects in the direction of an associated recess in the piston. The projection, in the circumferential direction, has two legs which are arranged at a distance from one another at a predetermined angle relative to the circumferential direction, preferably so as to extend perpendicular thereto. The two legs are connected with one another, at least at their free ends, by a stiffener. As a result, the smaller the cross-sectional width of these legs in the circumferential direction, the greater the elastic response in this direction, especially when the above-mentioned predetermined angle relative to the circumferential direction is substantially 90°. If the elasticity in the circumferential direction is to be reduced, the cross-sectional width of the legs, and therefore their spring rigidity, can be increased. However, this can also be made possible through the addition of an additional stiffener which could be inserted at a preselected distance from the free end of the legs. Conversely, by reducing the cross-sectional width of the legs, the spring rigidity of the legs can be reduced and therefore the springing response of the legs which can be achieved in this way can be adapted so as to be less rigid. Therefore, as a result of the construction of the driver according to the invention, a connection is provided between the piston of the lockup clutch and the turbine wheel which is elastic in the circumferential direction.

In further embodiments of the invention, additional possibilities for influencing this elasticity are provided. For example, this elasticity is comparatively small when each of the connections to the turbine wheel that are located between every two projections of the driver is also actually fastened to the turbine wheel, so that, between two such drivers, only the projection with its legs offers the possibility of introducing elasticity. However, when the recesses in the piston extend over a plurality of projections and only some of the connections which interconnect these projections are fastened to the turbine wheel, there results a series connection of two or more adjacent projections and accordingly a higher elasticity. This elasticity can be increased even further when none of the connections in the area of extension of the recesses having the above-mentioned large dimensions in the circumferential area are fastened to the turbine wheel. Accordingly, the fastenings are located only in the region between two recesses.

The elasticity can be further influenced in another embodiment in which an energy accumulator is provided between at least two of the projections. This energy accumulator is preferably formed by an elastomer element whose surfaces at the circumference are covered by a vulcanized coating in order to protect it from mechanical damage.

Since the invention pertains to the elasticity response achieved by means of the legs, it is unimportant whether these legs extend substantially radially outward proceeding from the turbine wheel so as to extend into the associated recess in the piston or whether these legs preferably extend axially and project into a recess of this type. It is only essential that an axial movement required for the two switching states of the piston—transfer of torque or inactivity—is made possible between each recess and the associated projection.

According to a further embodiment, the legs have, at their sides remote of the stiffening, transmission surfaces which are provided for producing a working contact with associated counter-surfaces of the recess at the piston, which counter-surfaces adjoin the transmission surfaces in the circumferential direction. Consequently, there is a large contact surface between the two transmission elements, so that the surface pressure can not increase beyond a tolerable degree. This results in a corresponding resistance to wear in these projections.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 is a perspective view showing a detail of the piston and driver with a recess at the piston for each projection of the driver, wherein the projections extend substantially axially proceeding from the turbine wheel;

FIG. 3 is similar to FIG. 2 but shows recesses at the piston in which a plurality of projections is received;

FIG. 4 is similar to FIG. 2 but shows projections extending substantially in the radial direction;

FIG. 5 is similar to FIG. 4 but shows recesses in the piston, each of which serves to receive a plurality of projections at the driver.

DETAILED DESCRIPTION OF THE PREFERRED EMBODIMENTS

Figure 1:
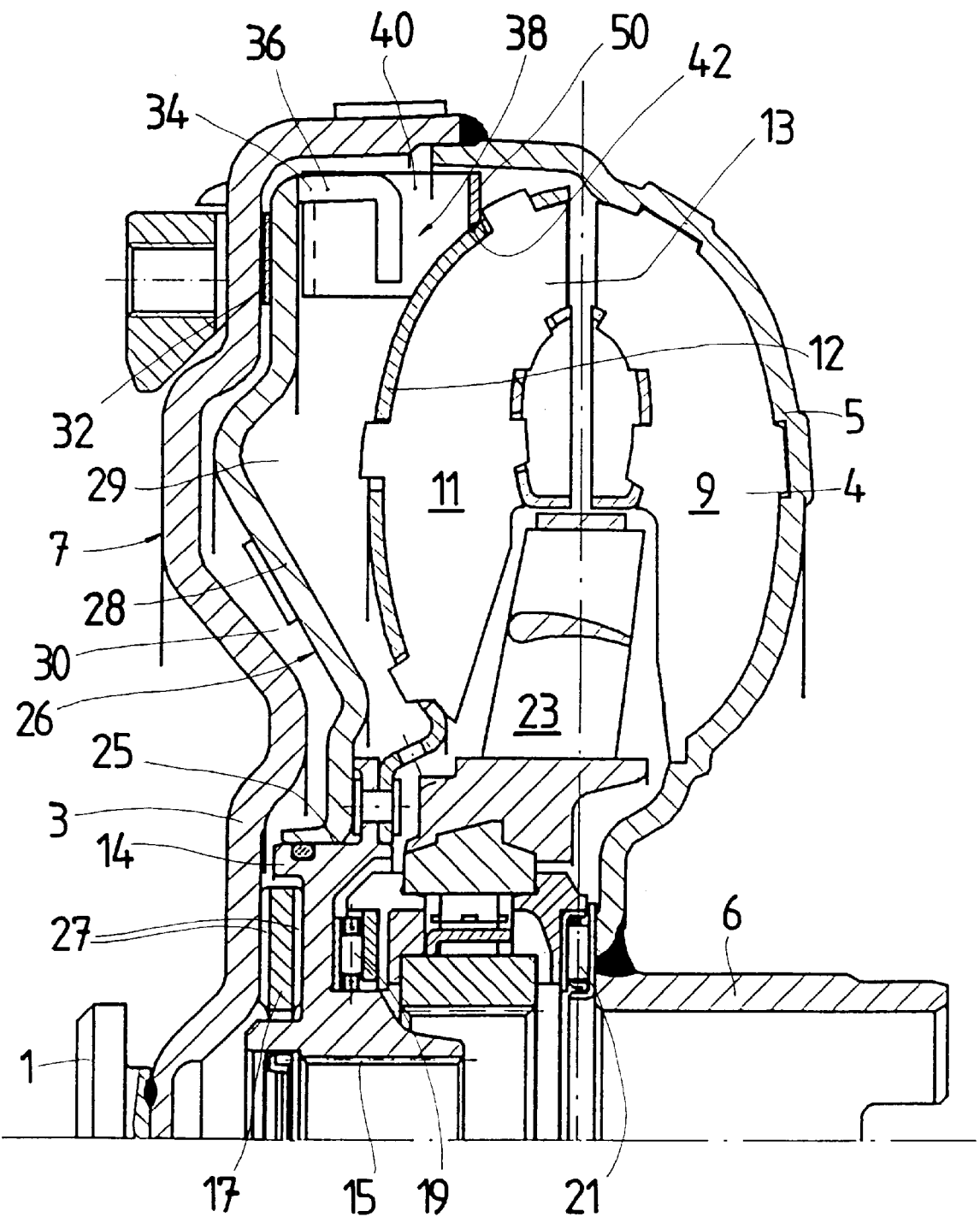
FIG. 1 shows the upper half of a longitudinal section through a hydrodynamic torque converter with the piston of a lockup clutch and a driver at the turbine wheel which engages with the piston so as to be fixed with respect to rotation relative to it.

FIG. 1 shows a hydrodynamic torque converter with a bearing journal 1 for connection to driving means, for example, an internal combustion engine. A primary flange 3 extends radially outward from the bearing journal 1. An impeller shell 5 is fastened to the primary flange 3 and carries a sleeve-shaped housing hub 6 in a fixed manner at its radial inner end. The structural component parts mentioned above form a converter housing 7, wherein the impeller shell 5, together with vanes 4, forms an impeller wheel 9. The impeller wheel 9 cooperates with a turbine wheel 11 which has a turbine shell 12 with which a vane arrangement 13 is fixedly connected. The turbine shell 12 is provided with a turbine hub 14 in the radial inner area, which turbine hub 14 is provided with an inner toothing 15 in order to transfer a rotating movement of the turbine wheel 11 to a driven shaft which is constructed in a conventional manner and is therefore not shown. The driven shaft for this purpose is preferably provided with an outer toothing adapted to the inner toothing 15. The turbine hub 14 is held in the axial direction via an axial bearing 17 on the drive side and via an axial bearing 19 on the driven side. The axial bearing 19 in turn supports a stator wheel 23 which engages between the impeller wheel 9 and the turbine wheel 11 and which contacts the corresponding part of the converter housing 7 at the other end via another axial bearing 21. Together with the impeller wheel 9 and the turbine wheel 11, the stator wheel 23 mentioned above forms a converter circuit 29.

A piston 28 of a lockup clutch 26 is arranged on a substantially axially extending support 25 of the turbine hub 14 so as to be rotatable and axially displaceable on the turbine hub 14. This piston 28 carries a friction facing 32 in the radial outer area and can be brought into working contact with a corresponding friction surface at the primary flange 3 for transferring torque. This is the case whenever the pressure in the converter circuit 29 is higher than that in a chamber 30 which is located axially between the piston 28 and the primary flange 3 and which can be acted upon by pressure in a manner which is known from the prior art, e.g., from German reference DE 44 23 640 A1, and is therefore not described more fully, for example, via a center bore in the above-mentioned driven shaft and grooves 27 in the axial bearing 17. As soon as an overpressure is built up in this manner in the chamber 30 in relation to the converter circuit 29, the piston 28 is lifted from the primary flange 3, so that torque can be transferred from the converter housing to the turbine hub 14 via the converter circuit 29.

The piston 28 is provided in its circumferential area with an axial shoulder 34 that extends in the direction of the turbine wheel 11. As can be seen more clearly from FIG. 2, considered in the circumferential direction, recesses 36 are provided at the axial shoulder 34 for the engagement of projections 40 which are fastened to the turbine shell 12 via connections 50 provided between two projections 40, preferably by means of a weld 42.

In FIG. 2, the piston 28 according to the invention and the driver 38 are shown in detail as individual parts. The Figures are described with reference to a plurality of projections 40 which extend in a wavy manner along the circumference; but in extreme cases it is also possible for the construction to be carried out with only one projection 40 according to the invention which engages in a corresponding recess 36 in the piston 28.

As is shown in FIG. 2, every projection 40 comprises two legs 44, 46 which extend substantially perpendicular to the surface of the turbine shell 12 and, in FIG. 2, substantially axially. The two legs 44, 46 are arranged at a distance from one another set by the width of a stiffener 48 which connects the free ends 45, 47 of the legs 44, 46 with one another. As can be seen from FIG. 2, the cross-sectional width of the legs is very narrow compared to the length of axial extension, so that when torque is introduced via the piston 28, the legs 44, 46 permit a deflection in the circumferential direction within the scope of their elasticity and accordingly act like a spring. The spring rigidity that is achieved in this way is relatively high when every projection 40 engages in a recess 36 of the piston 28 and every connection 50 between each two projections 40 is fastened to the turbine shell 12 of the turbine wheel 11 by means of a weld 42. This spring rigidity can be further increased in that the cross-sectional width of the webs 44, 46 is increased and/or an additional stiffening 48 is provided radially within the existing stiffening, which additional stiffening 48 can accordingly be provided at a predetermined distance from the free ends 45, 47 of the legs 44, 46 in the direction of the turbine shell 12.

As can be seen especially clearly from the perspective view in FIG. 2, the legs 44, 46 form surfaces with a transmission surface 52, 54 at each of their sides remote of the stiffening 48. The transmission surfaces 52, 54 are in a working connection with a counter-surface 56, 58, each of which is provided at the circumferential ends of every recess 36 of the piston 28. Due to the expansive construction of the transmission surfaces 52, 54 and the counter-surfaces 56, 58, an acceptable area pressing can also be achieved when high torques are transmitted.

As was already mentioned, the ends 60, 62 of the respective legs 44, 46 on the turbine shell side pass into the connections 50, wherein these connections 50, together with the wavy projections 40, form a transmission ring 64 which is fastened in its entirety to the turbine shell 12 of the turbine wheel 11.

If the transmission ring 64 and therefore the driver 38 should convey greater springing elasticity, it is possible according to FIG. 3 for each recess 36 in the piston 28 to be sufficiently dimensioned in the circumferential direction that a plurality of projections 40, in the case of FIG. 3, four projections, engages in each recess 36. The highest spring elasticity is achieved when, as is shown by way of example in FIG. 3, only the connections 50 which are located axially across from an axial shoulder 34 of the piston 28 are fastened to the turbine shell 12 via a weld 42. The connections 50 situated in between are moveable relative thereto in relation to the turbine shell 12, so that when a torque is conducted from the piston 28 via its axial shoulder 34 to the adjacent projection 40, this torque is transmitted via the other projections 40 adjacent to one another within the same recess 36 before the previously transmitted torque is conducted to the turbine wheel 11 at the location at which the next weld 42 viewed in the circumferential direction provides for a fastening of the corresponding connection 50 to the turbine shell 12. The particularly soft spring characteristic mentioned above is a result of the series connection of the projections 40 acting as individual springs. An average spring hardness can be adjusted by providing additional welds between the two welds 42 shown in the drawing, for example, the weld 72 shown in dash-dot lines. The quantity of projections 40 which are connected one behind the other and each of which generates a springing action therefore gives the spring characteristic of the driver 38.

Whereas, in FIGS. 2 and 3, the connections 50 act in the radial outermost area of the turbine shell 12 and the legs 44, 46 extend substantially axially, FIGS. 4 and 5 show projections 40' which extend substantially radially outward, wherein the connections 50' of these projections 40' which interconnect the projections 40' are provided well within the outer circumference of the turbine shell 12 in the radial direction. This does not change the principle of operation. The only difference between the solutions according to FIGS. 4 and 5 consists in that the recesses 36 are again constructed with sufficiently large dimensions in the circumferential direction in FIG. 5 such that they can receive a plurality of projections 40 in favor of a softer spring characteristic. This step is preferably combined with a reduction in welds 42.

Figure 6:
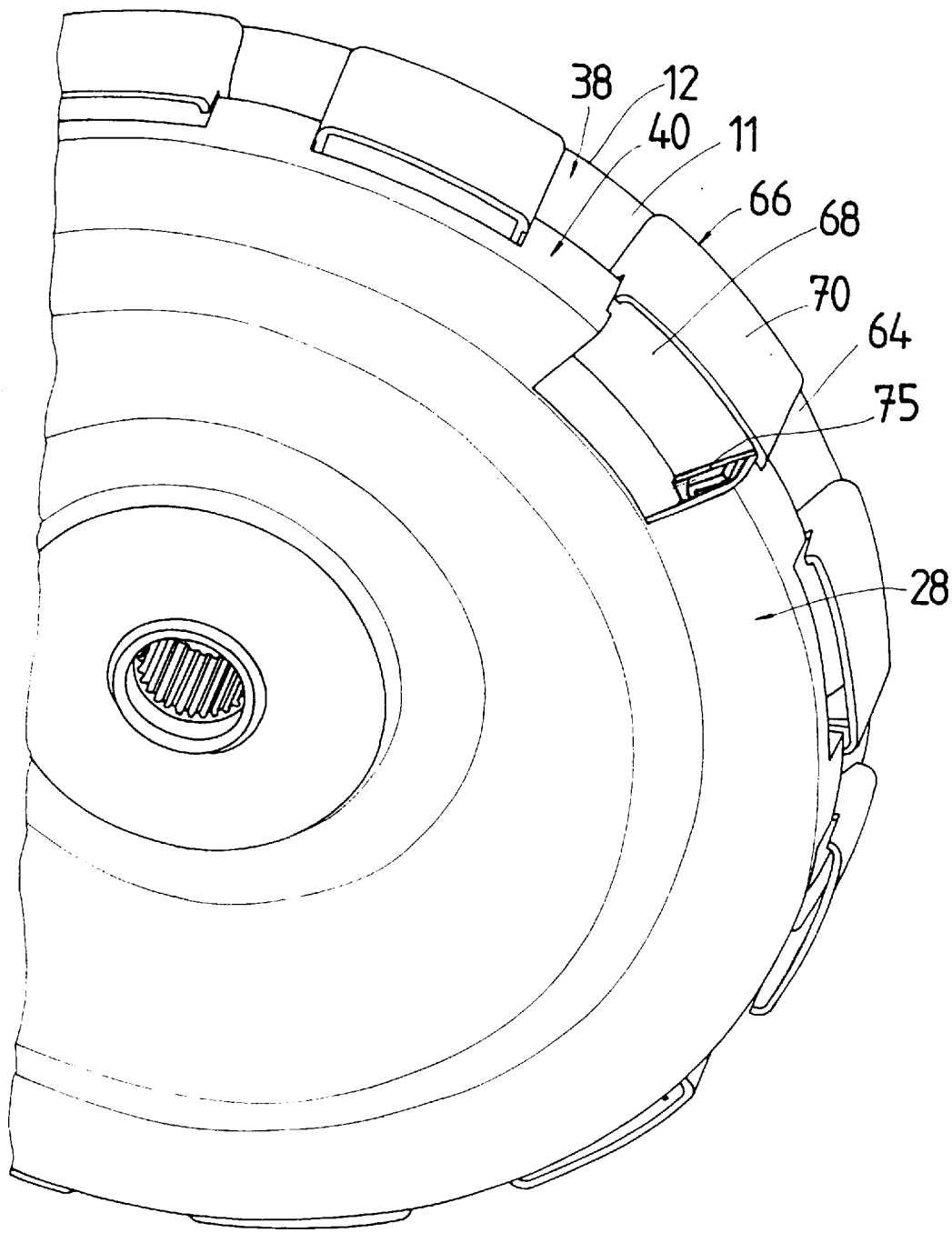
FIG. 6 is similar to FIG. 2 but shows energy accumulators between the projections.

While a spring effect is achieved in the embodiment examples described up to this point only by means of the projections 40 themselves, FIG. 6 shows another constructional variant in which an energy accumulator 66 is used between every two projections 40, 40' considered in the circumferential direction. This energy accumulator 66 can be a spring of optional form, but is preferably constructed as an elastomer element 68. This elastomer element 68 is radially supported against centrifugal forces by a cover plate 70 and has at its circumferential surfaces a vulcanized facing 75 for protecting against area pressing which is exerted by the piston 28. The spring characteristic can be further influenced by the selection of the elastomer and its dimensioning.

The invention is not limited by the embodiments described above which are presented as examples only but can be modified in various ways within the scope of protection defined by the appended patent claims.

I claim:

1. A hydrodynamic torque converter, comprising:

a converter circuit including an impeller wheel, a turbine wheel and a stator wheel;

a lockup clutch piston mounted next to the turbine wheel so as to be rotatable in a circumferential direction and displaceable in an axial direction; and a driver for the piston provided at the turbine wheel, the driver having at least one projection that projects towards an associated recess in the piston to produce a connection forming a positive engagement in the circumferential direction while allowing a relative movement of the piston in the axial direction, the projection having at least two legs arranged at a distance from one another at a predetermined angle relative to the circumferential direction, the legs having free ends, the projection further including a stiffener arranged at the free ends of the legs to connect the legs together, the legs having transmission surfaces remote of the stiffener so as to produce a working contact in each instance with an associated counter-surface of the associated recess of the piston which is adjacent to the transmission surface in the circumferential direction.

2. A hydrodynamic torque converter according to claim 1, wherein a plurality of the projections are provided around the circumference of the driver, each leg of the projection being coupled by a connection element arranged at an end of the leg located opposite the free end with a leg of an adjacent projection in the circumferential direction.

3. A hydrodynamic torque converter according to claim 2, wherein each of the recesses of the piston are configured to extend in the circumferential direction over a plurality of the projections, only a predetermined number fewer than all of the connections being fastened to the turbine wheel.

4. A hydrodynamic torque converter according to claim 3, wherein only the connections between every two recesses are fastened at the turbine wheel.

5. A hydrodynamic torque converter according to claim 2, wherein the projections together with the connections form a transmission ring fastened to the turbine wheel.

6. A hydrodynamic torque converter according to claim 5, wherein the projections form a wavy arrangement at the transmission ring.

7. A hydrodynamic torque converter according to claim 1, wherein the legs of the projection extend substantially in an axial direction into the associated recess of the piston.

8. A hydrodynamic torque converter according to claim 1, wherein the legs of the projection extend substantially in a radial direction into the associated recess of the piston.

9. A hydrodynamic torque converter according to claim 2, and further comprising an energy accumulator arranged between at least two of the projections.

10. A hydrodynamic torque converter according to claim 9, wherein the energy accumulator is an elastomer element.

11. A hydrodynamic torque converter according to claim 10, wherein the elastomer element has circumferential surfaces covered by a vulcanized facing.

\* \* \* \* \*